Jan. 22, 1929.
F. A. DILLINGHAM
1,699,835
WINDSHIELD
Filed Feb. 9, 1925
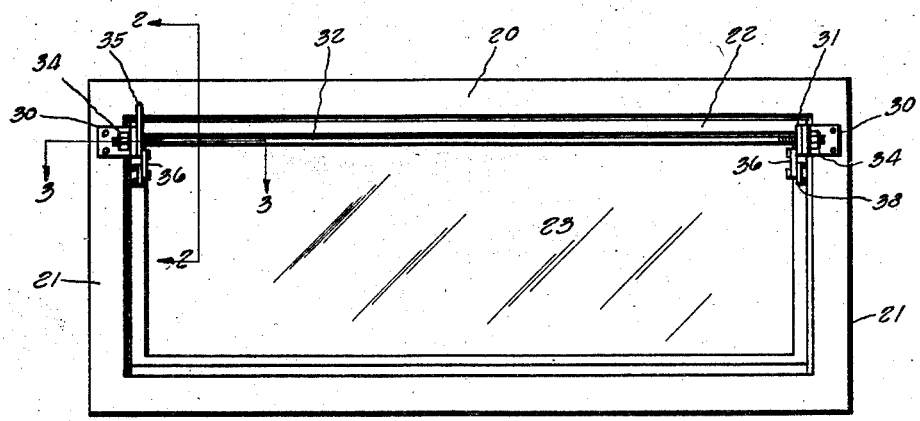
Fig. 1.
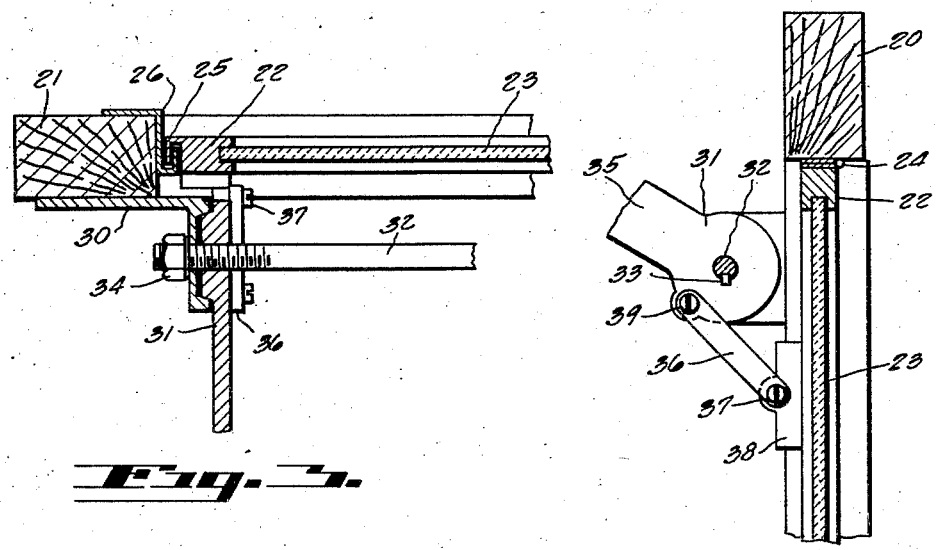
Fig. 3.
Fig. 2.
Inventor
Frederick A. Dillingham
By Moriehol and Fehr
Attorneys Patented Jan. 22, 1929.

1,699,835

UNITED STATES PATENT OFFICE.

FREDERICK A. DILLINGHAM, OF TROY, OHIO, ASSIGNOR TO THE TROY SUNSHADE COMPANY, OF TROY, OHIO, A CORPORATION OF OHIO.

WINDSHIELD.

Application filed February 9, 1925. Serial No. 7,929.

The present invention relates to windshields or the like, and particularly to windshields adapted for use in connection with motor vehicles.

One of the principal objects of the invention is to provide a movable windshield having operating means which may be operated by one hand to move the windshield to any desired operating position and to hold the windshield in such position.

Another object of the invention is to provide a windshield associated with a cooperating body member and having cooperating frictional operating members constructed and arranged so that the windshield may be readily moved to any operating position and frictionally held in such position by such cooperating frictional members.

Other and further objects of the invention will be apparent from the following description taken in connection with the accompanying drawings, in which—

Fig. 1 is an elevation of the windshield and cooperating body member upon which it is mounted;

Fig. 2 is a vertical cross section on the line 2—2 of Fig. 1; and

Fig. 3 is a horizontal section on the line 3—3 of Fig. 1.

Referring to the drawings 20 represents a body member which may be part of an automobile body or any other apparatus which it may be desired to provide with a movable member in the nature of a windshield, as herein illustrated. The body member 20 may be a frame-like construction having upper and lower horizontal portions and lateral side portions or posts 21 connected to the ends of said horizontal portions.

Mounted within or in cooperating relation with the body member 20 is a windshield frame member 22 preferably of metallic or other rigid construction having mounted therein a pane of glass 23. It will be understood that the heavy rigid portion 22 of the windshield may be varied in size and shape to provide the necessary strength for properly supporting the pane of glass 23, or it may be omitted entirely if desired. The term "frame member" herein employed should, therefore, be understood to apply to the pane of glass 23 alone as well as to the construction in which the pane of glass is bounded by a heavy supporting or reinforcing material.

In the preferred construction I employ the reinforcing or frame member 22 which may be set into the opening provided by the body member 20, the upper horizontal portion of the frame member 22 being pivoted in the body member 20 as at 24, the mounting being such that the lower portion of the windshield is adapted to be swung outwardly from the body member 20. The upright or side portions of the frame member 22 may be provided with rearwardly opening grooves at 25 which are adapted to cooperate with the U-shaped channels or flanges 26 carried by the side posts 21 of the body member in order to prevent the ingress of water to the interior of the automobile. Likewise suitable sealing means may be provided between the lower portions of the body member 20 and the frame member 21 to seal the same against the ingress of water.

The apparatus for operating the windshield to its several operating positions will now be described. It consists of a body bracket 30 mounted on each side post of the body member 20 and a rotatable or movable member 31 in frictional engagement with the bracket 30. The bracket 30 and the movable member 31 are provided with interfitting conical portions and the rotatable members 31 at opposite sides of the windshield are rigidly connected together by means of a rod 32. The rod 32 is in screw threaded engagement with each of the rotatable members 31 and the latter are keyed thereon by means of keys 33 to insure movement of the rotatable members 31 in unison with one another. During assembling the rod 32 is adjusted to effect desired positioning thereon of the members 31, prior to insertion of the keys 33, to regulate their relative location with respect to their cooperating brackets 30. Mounted on the outer ends of the rod 32 are nuts 34 by which the frictional engagement between the members 31 and the body brackets 30 may be adjusted after the device is assembled, the interfitting conical portions of the body bracket 30 and the rotatable member 31 being so shaped that the parts may be held in strong frictional engagement and yet be rotated by hand without requiring excessive exertion on the part of the operator. To rotate the members 31 and the rod 32 one of the rotatable members 31 is preferably provided with an operating handle 35, although it will be understood that the operating handle may be secured to any part of the rotatable parts 31—32, or that operating handles may be placed on both of the rotatable members 31, if desired, so that the parts may be operated from either side of the automobile.

Each of the rotatable members 31 is connected with the adjacent portion of the frame member 22 by means of a link 36 which at its lower end is pivotally connected at 37 to the frame bracket 38 secured to the frame member 22 and which at its upper end is pivotally connected at 39 to the rotatable member 31, the pivot 39 being offset from the rod 32 about which the member 31 revolves.

The position of the operating means when the windshield is closed is shown in Fig. 2. In operation, when it is desired to open the windshield, the handle 35 is drawn downwardly thereby rotating the rotatable members 31 in unison, and such rotational movement is transmitted through the links 36 to the frame member 22, thereby moving the lower portion of the windshield outwardly to open the same. The opening of the windshield is determined by the extent of movement of the operating handle 35, but when the pivots 37 and 39 of the link 36 are in line with the rod 32 then the windshield is in its wide open position. The construction and relation of the parts is such that the windshield may be caused to assume any of its operating positions merely by manipulating the handle 35 and this may be done without requiring excessive or unusual exertion on the part of the operator. Further, owing to the novel and peculiar construction and arrangement of the parts, the operating means will hold the windshield in any position to which it may be moved, due to the frictional resistance, and this without the necessity of manipulating locking screws or other devices for locking the windshield in position. It should be observed further that, in the preferred embodiment shown, when the windshield is in its wide open position, which is perhaps the most usual open position for a windshield of this type, the links 36 together with their pivots 37 and 39 are in direct line with the rod 32, and as a consequence when the windshield is in this position there is substantially no tendency for the windshield to cause rotational movement of the rotatable member 31 with respect to its body bracket 30.

From the foregoing it will be apparent that the present invention provides a simple and novel means for operating a windshield with one hand. Further that it provides operating means by which the windshield may be easily moved to any desired operating position and retained in such position without the necessity for actuating any auxiliary locking means.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a windshield for automobiles and the like, a body member, a frame member, means for pivotally connecting said frame member with the body member, and means comprising cooperating relatively rotatable friction members connected between said body and frame members respectively manually operable to move the frame member into any of its operating positions and to frictionally hold the same in such positions.

2. In a windshield for automobiles and the like, a body member, a frame member, means for pivotally connecting said frame member with the body member, means comprising cooperating relatively rotatable friction members connected between said body and frame members respectively, and an operating handle, said means being so constructed and arranged that by actuating said operating handle only to rotate one of said friction members the frame member may be moved into any operating position and frictionally held in such position.

3. In a windshield for automobiles and the like, a body member having side posts, a movable windshield member pivotally connected with the body member, friction means connected between each of said posts and said movable windshield member including a bracket member and a rotatable part adapted in rotatable frictional engagement with said bracket member and upon rotation of said part, to cause the windshield to swing about its pivotal connection, means rigidly connecting said rotatable parts to cause the same to move in unison, and means for rotating said rotatable parts.

4. In a windshield for automobiles and the like, a body member having side posts, a movable windshield member pivotally connected with the body member, means connected between opposite edges of the windshield member and the corresponding parts of the frame member for actuating the windshield member about its pivotal connection, each of said means comprising a bracket secured to one of said members, a part rotatable relative thereto, a link connected at one end to said rotatable part at one side of its center of rotation and at its other end to said other member, and means connecting said rotatable members to cause the same to move in unison.

5. In a windshield for automobiles and the like, a body member having side posts, a movable windshield member pivotally connected with the body member, means connected between opposite edges of the windshield member and the corresponding parts of the frame member for actuating the windshield member about its pivotal connection, said means comprising brackets secured to one of said members, rotatable parts connected with said other member and in cooperative frictional engagement with said brackets, and a rod for connecting said rotatable parts together and for holding them in frictional engagement with their cooperating brackets.

6. In a windshield for automobiles and the like, a body member having side posts, a movable windshield member pivotally connected with the body member, means connected between opposite edges of the windshield member and the corresponding parts of the frame member for actuating the windshield member about its pivotal connection, said means comprising brackets secured to said body member, rotatable parts connected with said frame member and in cooperative frictional engagement with said brackets, and a rod for securing said rotatable parts together to cause the same to rotate in unison and for holding them in frictional engagement with their cooperating brackets.

7. In a windshield for automobiles and the like, a body member, a frame member, and means for moving the frame member relative to the body member and frictionally holding it in any desired position, said means comprising a bracket secured to the upright side edge of one of said members, a rotatable part, means for pivotally connecting said part with said bracket and for holding it in frictional engagement therewith and a link pivotally connected between the upright side edge of the other said member and the rotatable part, the connection between the link and said rotatable part being offset from the pivotal axis between the rotatable part and its bracket.

8. In a windshield for automobiles and the like, a body member, a frame member, and means for moving the frame member relative to the body member and frictionally holding it in any desired position, said means comprising a bracket secured to the upright side edge of one of said members, a rotatable part pivotally mounted on said bracket, said rotatable part and bracket having interfitting cone members adapted to be held in firm frictional engagement with one another, and a link pivotally connected between the upright side edge of the other said member and the rotatable part, the connection between the link and said rotatable part being offset from the pivotal axis between the rotatable part and its bracket.

9. In a windshield for automobiles and the like, a body member, a frame member pivotally connected with the body member, and means for moving the frame member about said pivotal connection, said means comprising a bracket secured to one of said members, a part rotatably mounted on said bracket, and a link pivotally and eccentrically connected with the rotatable part and pivotally connected with said other member, the construction and arrangement of the parts being such that when the frame member is swung to its open position, the link is substantially in alignment with the pivotal mounting for the rotatable part.

10. In a windshield for automobiles and the like, a body member, a frame member, means for pivotally connecting said frame member with said body member, projecting brackets secured to said body member adjacent opposite edges of the frame member, members connected with said frame member and positioned adjacent opposite edges of said frame member, said brackets and said members having cooperating means for retaining said frame member in adjusted position, a cross rod connecting said members for simultaneous adjusting movement, and an operating handle connected to said cross rod, operation of said handle serving to effect relative movement of said cooperating means whereby the windshield may be adjusted with one hand by said handle, said cooperating means serving to hold said frame in its adjusted position.

In testimony whereof I hereto affix my signature.

FREDERICK A. DILLINGHAM.

CERTIFICATE OF CORRECTION.

Patent No. 1,699,835. Granted January 22, 1929, to

FREDERICK A. DILLINGHAM.

It is hereby certified that error appears in the printed specification of the above numbered patent requiring correction as follows: Page 2, line 100, claim 3, strike out the word "adapted" and insert the same to follow after the word "and" in line 102; and that the said Letters Patent should be read with this correction therein that the same may conform to the record of the case in the Patent Office.

Signed and sealed this 26th day of February, A. D. 1929.

(Seal)

M. J. Moore,
Acting Commissioner of Patents.